Figure 1:
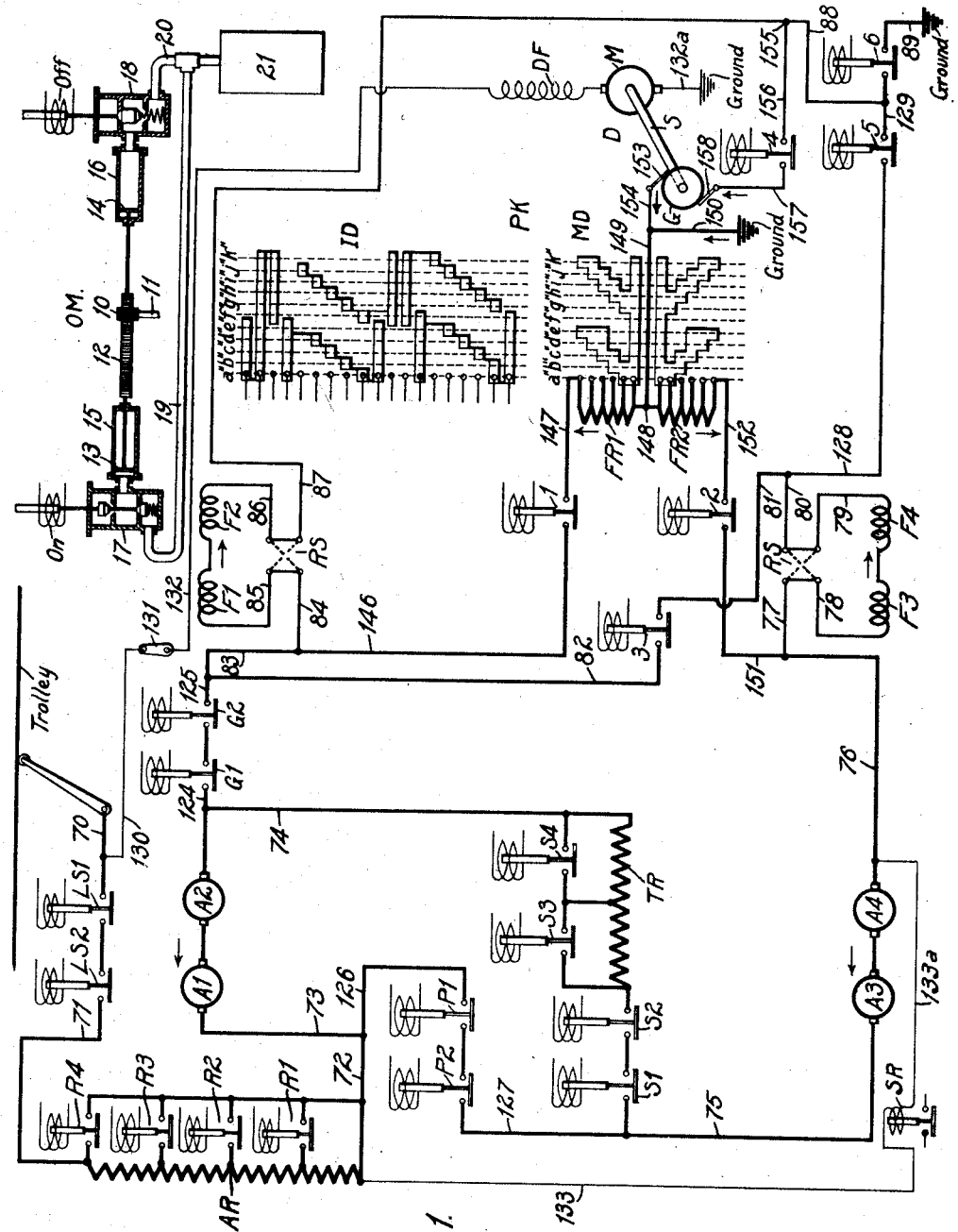

A. J. HALL.
SYSTEM OF CONTROL.
APPLICATION FILED JUNE 5, 1916.

1,280,990.

Patented Oct. 8, 1918.
5 SHEETS—SHEET 1.

WITNESSES:
R. J. Fitzgerald
W. R. Coley

INVENTOR
Arthur J. Hall.
BY
Wesley G. Carr
ATTORNEY

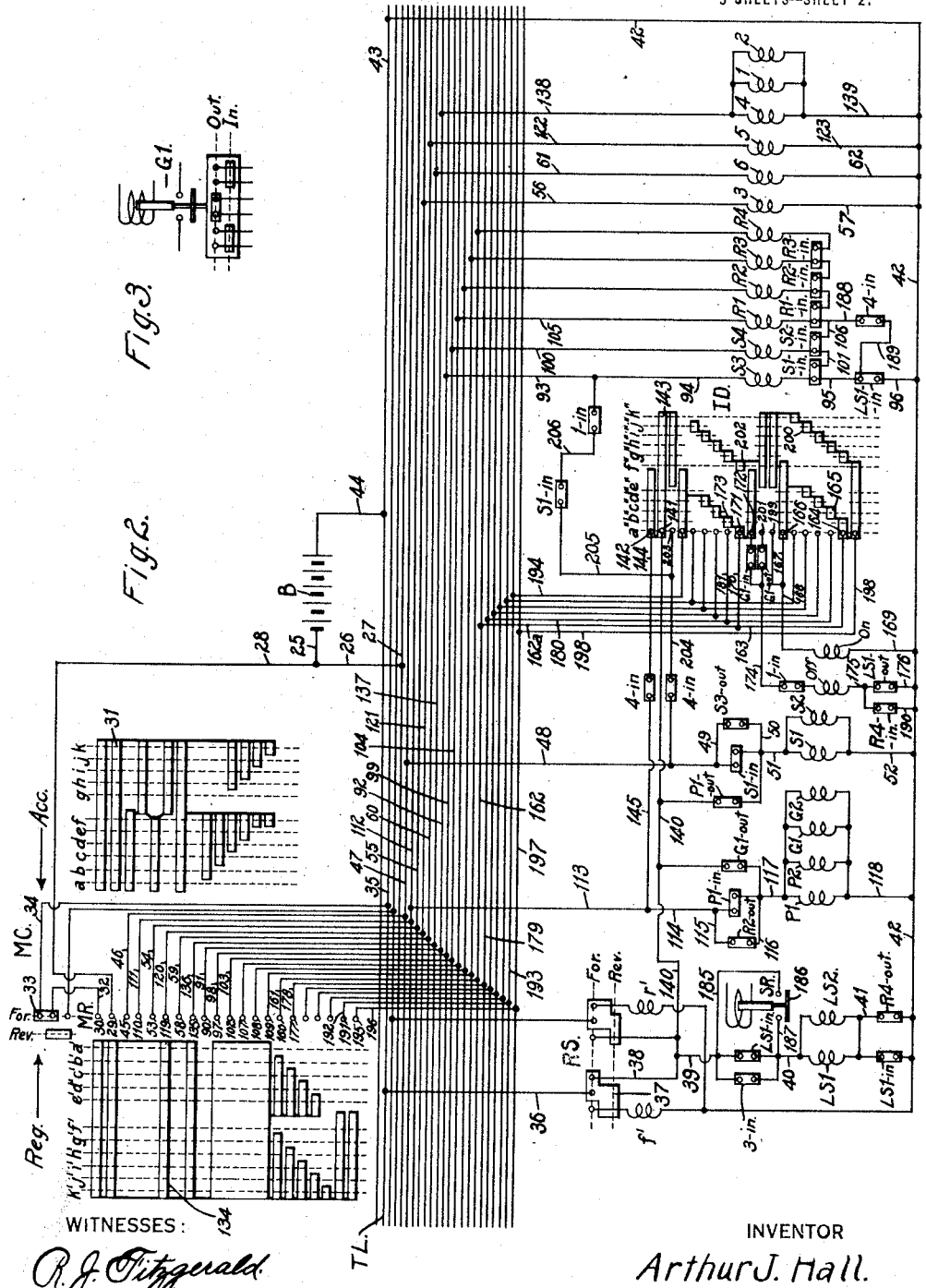
A. J. HALL.
SYSTEM OF CONTROL.
APPLICATION FILED JUNE 5, 1916.
1,280,990.
Patented Oct. 8, 1918.
5 SHEETS—SHEET 2.
WITNESSES:
R. J. Fitzgerald
W. R. Coley
INVENTOR
Arthur J. Hall.
BY
Wesley G. Carr
ATTORNEY A. J. HALL.
SYSTEM OF CONTROL.
APPLICATION FILED JUNE 5, 1916.
1,280,990.
Patented Oct. 8, 1918.
5 SHEETS—SHEET 3.
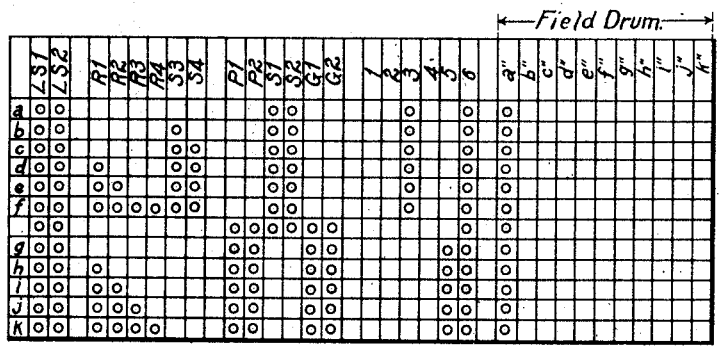
Fig. 4. Acceleration Sequence of Switches.
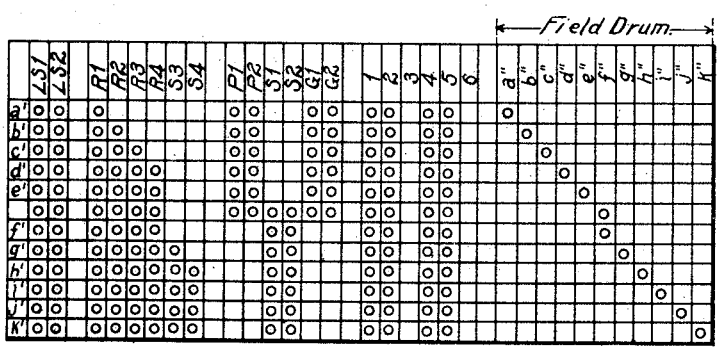
Fig. 5. Regeneration Sequence of Switches.
WITNESSES:
R. J. Fitzgerald
W. R. Coles
INVENTOR
Arthur J. Hall.
BY
Wesley G. Carr
ATTORNEY

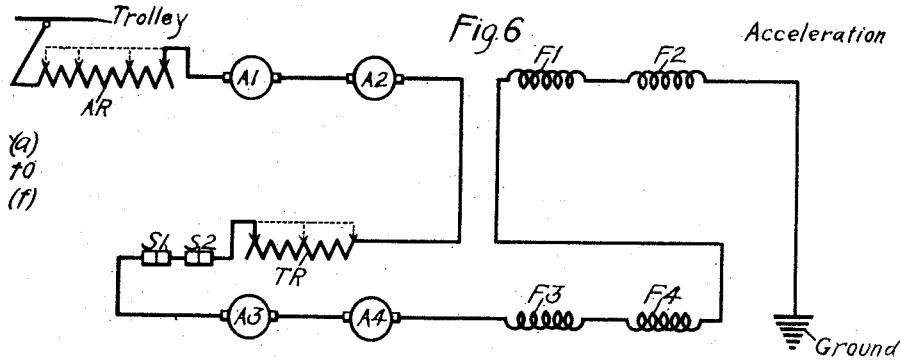
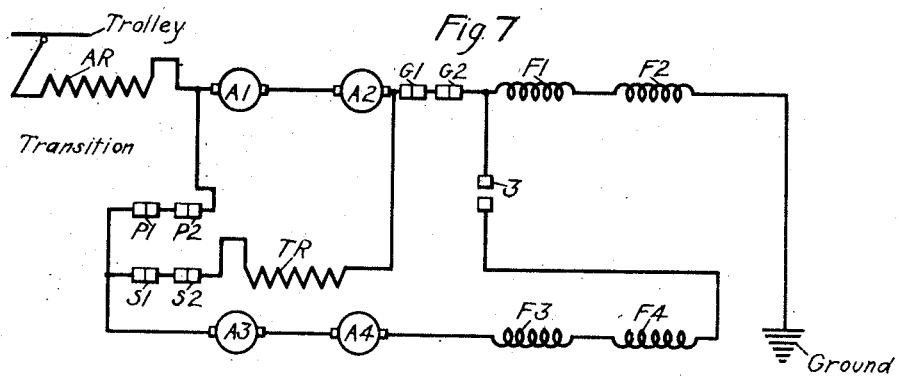
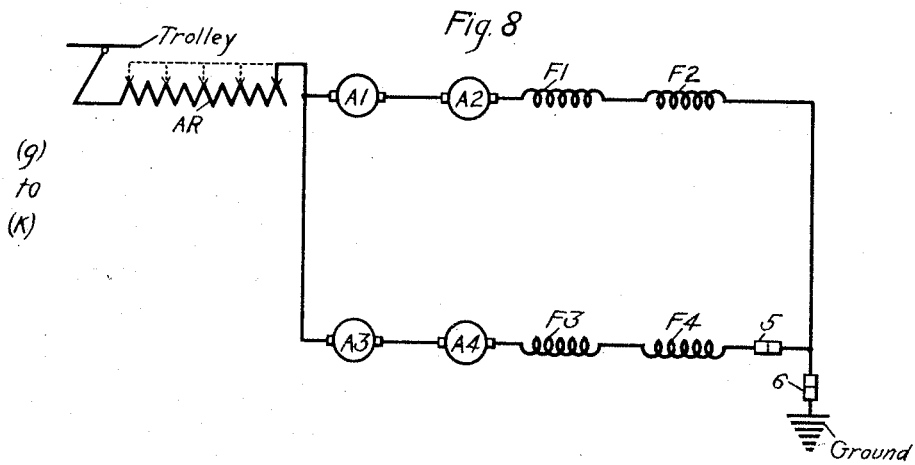

A. J. HALL.
SYSTEM OF CONTROL.
APPLICATION FILED JUNE 5, 1916.
1,280,990.
Patented Oct. 8, 1918.
5 SHEETS—SHEET 5.
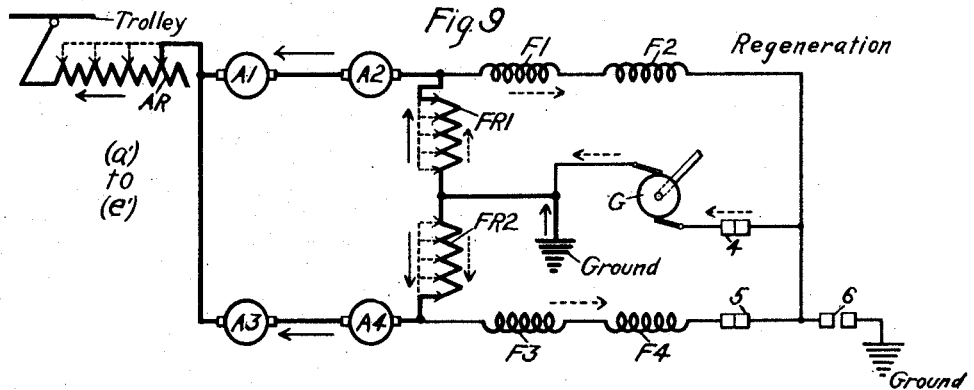
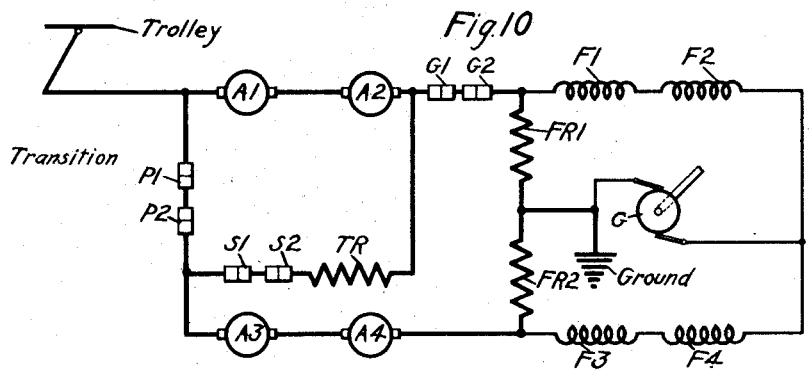
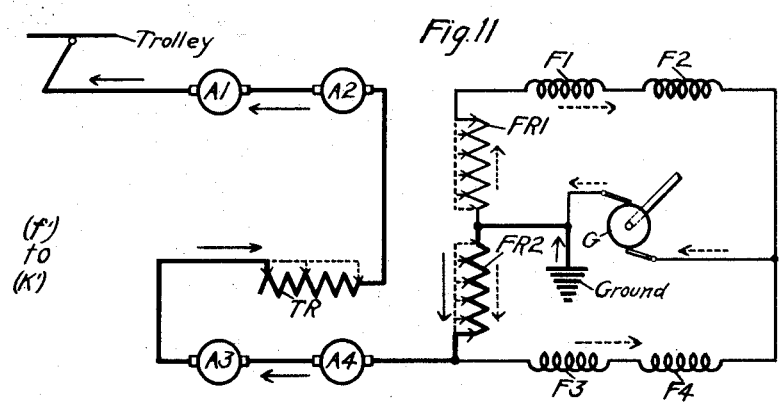
WITNESSES:
INVENTOR
Arthur J. Hall
BY
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,280,990.  Specification of Letters Patent.  Patented Oct. 8, 1918.

Application filed June 5, 1916. Serial No. 101,730.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Systems of Control, of which the following is a specification.

My invention relates to systems of control and especially to the regenerative control of electric railway motors and the like.

One object of my invention is to provide a system of the above-indicated character wherein, during both the accelerating period when "series-parallel" operation is employed and during the regenerative period when "parallel-series" operation is used, all of the field-magnet windings of the machine shall remain on the negative or ground side of all of the armatures, which system of connections is particularly desirable in relatively high-voltage systems.

Another object of my invention is to provide a system of the class under consideration wherein, by reason of the above-mentioned peculiar arrangement of field-magnet windings, the numbers of switches and circuit changes required for passing from acceleration to regeneration, or vice versa, may be reduced to a minimum.

A further object of my invention is to provide a regenerative control system of the type wherein an auxiliary source of energy is utilized for exciting the main-machine field winding during the regenerative period and wherein such excitation may be varied by suitable manipulation of a field-circuit resistor, and means for insuring the complete short circuit of all main regenerative-circuit resistors before the field-circuit regulation is effected, the preventive action in question taking place irrespective of the initial connection of the momentum-driven machines in either parallel or series relation.

A still further object of my invention is to provide a system of the type under discussion which shall be relatively simple and inexpensive in construction and effective and reliable in operation, and which shall embody novel features relating to certain portions of the control system, as hereinafter more fully set forth.

My invention may best be understood by reference to the accompanying drawings, wherein Figure 1 is a diagrammatic view of the main circuits of a system of control embodying my invention; Fig. 2 is a diagrammatic view of the auxiliary governing circuits that are employed for manipulating the main-circuit connections in accordance with the sequence charts of well-known form that are shown in Fig. 4 and in Fig. 5 which correspond to acceleration and regeneration, respectively; Fig. 3 is a detail diagrammatic view of a complete switch to be employed in connection with the systems that are shown in Fig. 1 and Fig. 2; and Fig. 6 to Fig. 11, inclusive, are simplified diagrammatic views of various main-circuit connections during both acceleration and regeneration, as indicated by the accompanying legends.

Referring to Fig. 1 of the drawing, the system shown comprises a pair of suitable supply-circuit conductors respectively marked "Trolley" and "Ground"; a plurality of dynamo-electric machines, preferably of the twin-armature type and respectively having permanently series-connected armatures A1 and A2, and A3 and A4, and field-magnet windings of the series type permanently connected in pairs and designated as F1 and F2, and F3 and F4, respectively; a main accelerating resistor AR which is adapted to be short-circuited in sections by a plurality of suitable switches R1, R2, R3 and R4; a transition resistor TR that is adapted to be short-circuited in sections by suitable switches S3 and S4; a plurality of main-circuit switches LS1, LS2, S1, S2, P1, P2, G1, G2 and 5 that are employed during both acceleration and regeneration of the main machines; a pair of similar switches 3 and 6 that are utilized during the accelerating period only, and another pair of similar switches 1 and 2 that are used only during regenerative operation; a reversing switch RS, preferably of a familiar electrically-controlled type and conventionally shown for the sake of simplicity and clearness; an auxiliary dynamotor or motor-generator set D that is driven from the supply circuit and is adapted to furnish exciting current to the main field windings, under regenerative conditions; a plurality of field-regulating resistors FR1 and FR2 that are associated with the respective main machines during the regenerative period; a switching device PK, preferably of the drum type, for varying the active circuit value of the field-regulating resistors FR1 and FR2 and for performing certain auxiliary circuit manipulations, as hereinafter described; an operating mechanism OM for the control drum PK; and a selective relay device SR that is associated with the main circuits, in a manner to be described, for initially connecting the main machines to the supply circuit during the regenerative period.

The dynamotor D may be of any familiar and suitable construction and is shown as comprising an exciting armature winding G, a driving armature winding M therefor, which is shown as mechanically associated with the armature winding G by means of a shaft $s$, although any other suitable construction may be employed; and a field-magnet winding DF of the series type for mutually exciting the armature windings M and G, as is customary in dynamotors. It will be understood that any suitable type of motor-generator set may be utilized, if desired, in preference to the dynamotors just recited.

The control drum PK is provided with a plurality of main-circuit contact segments that are disposed upon a main drum portion MD for varying the active circuit value of the field-regulating resistors FR1 and FR2, and a second or interlock drum portion ID for manipulating certain auxiliary governing circuits in a manner to be set forth. The control drum PK is shown as adapted to occupy a normal position $a''$ and a plurality of successive operative positions $b''$ to $k''$, although any other suitable number of positions may be utilized, as will be understood.

The operating mechanism OM for the control drum PK is of a well-known electrically-controlled, fluid-pressure-actuated type and comprises a pinion member 10 that is rigidly connected to the upper end of the shaft 11 of the control drum and is adapted to mesh with a horizontally-movable rack member 12, the opposite ends of which constitute pistons 13 and 14 which respectively operate within suitable cylinders 15 and 16. A pair of valves 17 and 18 are associated with the respective cylinders 15 and 16 and are adapted to admit fluid-pressure thereto through pipes or passages 19 and 20 from a source of fluid-pressure 21, under predetermined conditions. The valve 17 is of a well-known type that is normally closed to prevent the access of fluid-pressure from the pipe 19 to the cylinder 15 and to connect the cylinder with the atmosphere; whereas, the other valve 18 is of an inverted type which allows fluid-pressure from the source 21 to enter the cylinder 16 and thus bias the operating mechanism OM and the control drum PK to the illustrated positions; and the valve is, of course, adapted to cut off communication between the cylinder 16 and the atmosphere, under the assumed conditions. The valves 17 and 18 are preferably electro-magnetically controlled and are provided with actuating coils respectively marked "On" and "Off" which are connected in circuit in a manner to be described in connection with Fig. 2.

Assuming the various parts of the operating mechanism OM to occupy the positions shown, the operation thereof without regard to the controlling or controlled electrical connections may be set forth as follows: Upon energization of both of the actuating coils "On" and "Off" the normal unbalanced-pressure conditions are reversed, whereby fluid-pressure is admitted to the cylinder 15 and is exhausted from the cylinder 16 to cause a movement of the operating mechanism OM toward the right and a corresponding actuation of the control drum PK toward the left. To arrest the movement of the operating mechanism at any time, the "off" magnet is deënergized, whereby balanced fluid-pressure conditions obtain in the cylinders 15 and 16 and a positive and reliable stoppage of the control drum in the desired position is effected, as hereinafter set forth in more detail. To effect the return of the operating mechanism and control drum to their normal illustrated positions, it is merely necessary to deënergize both actuating coils "On" and "Off," whereupon the initial unbalanced-pressure conditions are again in force and movement of the parts toward the positions shown takes place.

Reference may now be had to Fig. 2, which shows, in addition to the actuating coils of the various main-circuit switches, the interlock drum ID and the auxiliary contact members of the reversing switch RS and the selective relay SR, a plurality of electrical interlocking contact members that are associated with, and adapted to be actuated by, various main-circuit switches in accordance with the familiar construction that is illustrated in Fig. 3, which represents the complete switch G1; a master controller MC that is adapted to assume a plurality of operative positions $a$ to $k$ when moved in one direction that corresponds to acceleration of the main machines and a plurality of operative positions $a'$ to $k'$ when actuated in the other direction that corresponds to regenerative operation; a master reverser MR that is associated with the actuating coils $f'$ and $r'$ of the reversing switch RS as is customary; a source of energy, such as a battery B, for energizing the various actuating coils; and a plurality of train-line conductors TL for connecting the actuating coils to the master controller and for adapting my system for use in "multiple control" systems, as will be understood.

Assuming that the connections are as illustrated and that it is desired to effect acceleration of the main machines, the master controller MC may be actuated to its initial operating position a, whereupon a circuit is established from one terminal of the battery B through conductors 25 and 26 to the train-line conductor 27, while an active circuit for the illustrated system is completed from conductor 25 through conductor 28, control fingers 29 and 30, which are bridged by contact segment 31 of the master controller, conductor 32, contact member 33 of the master reverser MR in its forward position, conductor 34, train-line conductor 35, conductor 36, contact member 37 of the main reversing-switch RS in its forward position, conductors 38 and 39, interlock 3-in, conductor 40, the parallel-related actuating coils of the switches LS1 and LS2, conductor 41, interlock R4-out, conductor 42, train-line conductor 43, and conductor 44 to the other terminal of the battery B. The closure of the switch LS1 effects the bridging of interlocks 3-in and R4-out by two interlocks LS1-in, thereby forming a familiar "holding circuit" for the line switches LS1 and LS2.

A similar circuit is established from the contact segment 31 of the master controller through control finger 45, conductor 46, train-line conductor 47, conductors 48 and 49, interlock S3-out, conductors 50 and 51, the parallel-related actuating coils of the switches S1 and S2 and conductor 52 to the negative conductor 42. A "holding circuit" is formed, upon the closure of switch S1, by the connection of an interlock S1-in between conductors 49 and 50.

A third circuit is completed from the contact segment 31 of the master controller through control finger 53, conductor 54, train-line conductor 55, conductor 56, the actuating coil of the switch 3 and conductor 57 to the negative conductor 42.

A fourth circuit is established at this time from the contact segment 31, through control finger 58, conductor 59, train-line conductor 60, conductor 61, actuating coil of the switch 6 and conductor 62 to the negative conductor 42.

The main circuits (see Fig. 1 and Fig. 6) that are established by the closure of the above-mentioned switches may be traced as follows: from the trolley through conductor 70, switches LS1 and LS2, conductor 71, the entire accelerating resistor AR, conductors 72 and 73, main armatures A1 and A2, conductor 74, transition resistor TR, switches S2 and S1, conductor 75, main armatures A3 and A4, conductors 76 and 77, certain contact members (not shown) of the main reversing-switch RS, conductor 78, main field windings F3 and F4, conductor 79, other contact members (not shown) of the reversing switch RS, conductors 80 and 81, switch 3, conductors 82, 83 and 84, reversing-switch RS, conductor 85, main field windings F1 and F2, conductor 86, reversing-switch RS, conductors 87 and 88, switch 6 and conductor 89 to the negative conductor ground. The motors are thus connected in series relation across the supply-circuit, with all of the accelerating resistors in circuit, as shown in a simplified manner in Fig. 6.

Referring again to Fig. 2, upon actuation of the master controller MC to its second position b, a circuit is established from the contact segment 31, through control finger 90, conductor 91, train-line conductor 92, conductors 93 and 94, actuating coil of the switch S3, conductor 95, interlock LS1-in, and conductor 96 to the negative conductor 42, whereby one section of the transition resistor TR is short-circuited.

Movement of the master controller to its position c completes a circuit from the contact segment 31 through control finger 97, conductor 98, train-line conductor 99, conductor 100, actuating coil of the switch S1, conductor 101, interlock S1-in and thence through conductor 95 as already recited.

When the master controller is moved to position d, control finger 102 engages contact segment 31, whence circuit is completed through conductor 103, train-line conductor 104, conductor 105, actuating coil of the switch R1, conductor 106, interlock S2-in and thence through conductor 101, as previously described.

In a similar manner, actuation of the master controller to its successive positions e and f, respectively effects the engagement of the contact segment 31 with control fingers 107 and with control fingers 108 and 109, whence circuit is completed through the actuating coils of the switch R2 and through the actuating coils of the switches R3 and R4, which are simultaneously closed in this instance. The various sections of the accelerating resistor AR are thus progressively short-circuited as the master controller is moved toward its position f, which corresponds to "full series" connection of the motors.

Upon actuation of the master controller to its initial parallel position g to first effect the transitional connections of Fig. 7, the contact segment 31 becomes disengaged from the control fingers 90, 97, 102, 107, 108 and 109, whereby the accelerating resistors are again actively connected in circuit, and a new circuit is then completed from the contact segment 31 through control finger 110, conductor 111, train-line conductor 112, conductors 113, 114 and 115, interlock R2-out, conductors 116 and 117, the parallel-related actuating coils of the switches P1, P2, G1 and G2 and conductor 118 to the negative conductor 42. As soon as the switch P1 is closed, a holding circuit is formed by the connection of interlock P1-in between the conductors 115 and 116. The opening of the switch S1 does not occur upon the disengagement of the contact segment 31 from the control finger 45, between the positions $f$ and $g$ of the master controller, by reason of the location of an interlock P1-out between conductor 51 and conductor 140, which is connected to the positively-energized conductor 38. Consequently, the closure of the parallel-connecting switches P1, P2, G1 and G2 occurs before the opening of the series-connecting switch S1 by reason of the interlocking arrangements just recited, which are more fully set forth and claimed in my co-pending application, Serial No. 83,732, filed March 13, 1916, thus providing a continuous or uninterrupted transition of the motors to parallel relation.

The switch 3 is opened simultaneously with, or preferably prior to, the opening of the various resistor short-circuiting switches, and thus, the main field windings F1 and F2 are inactive until the switches G1 and G2 are closed to directly connect these field windings to the corresponding armatures A1 and A2. The switch 5 is closed at substantially the same time as the parallel-connecting switches P1, etc., by reason of the establishment of a circuit from the contact segment 31 through control finger 119, conductor 120, train-line conductor 121, conductor 122, actuating coil of the switch 5 and conductor 123 to the negative conductor 42. The master controller MC is purposely adapted to open the switch 3 prior to the closure of the switch 5, since a simultaneous closure of the two switches in question would effect a short-circuit of the main field windings F1 and F2, which, of course, would cause a dangerous rush of current through the corresponding main armatures. The transitional connections are shown in simplified form in Fig. 7.

When the master controller occupies its initial parallel position $g$, the main circuit connections (Fig. 1 and Fig. 8) may be traced as follows: A common circuit is established from the switches LS1 and LS2 through the entire accelerating resistor AR and conductor 72, where the circuit divides one branch including conductor 73, main armatures A1 and A2, conductor 124, switches G1 and G2, conductors 125 and 83 and thence to the negative conductor ground, in accordance with the previously described circuit, and the other branch including conductor 126, switches P1 and P2, conductors 127 and 75, main armatures A3 and A4, conductors 76 and 77, through the main field windings F3 and F4, as hereinbefore traced, conductors 80 and 128, switch 5, conductor 129 and thence, through switch 6, to the negative conductor ground.

It should be noted that, throughout the previously described series-operation of the motors and during the series-parallel transition just recited, all of the main field windings are maintained upon the negative or ground side of all of the main armatures, and such arrangement is maintained during the parallel accelerating operation of the motors, which is governed by actuating the master controller through positions $h$, $i$, $j$ and $k$ to effect progressive engagement of contact segment 31 with control fingers 102, 107, 108 and 109, whereby the various sections of the accelerating resistor AR are successively short-circuited, in the manner described in connection with series acceleration.

The advantages of maintaining the field windings on the ground side of the armatures, such as relatively small cost and space requirements of insulating material and lessened liability to "grounding" troubles, particularly in relatively high-voltage systems, are believed to be well understood, and no further exposition thereof is deemed necessary here.

Assuming that conditions are suitable for relatively high-speed regenerative operation, the master controller MC may be moved to its initial regenerative position $a'$, whereupon contact segment 134 engages control finger 119, whence circuit is completed through the actuating coil of the switch 5, as previously described, and whereby another circuit is completed from the contact segment 134 through control finger 135, conductor 136, train-line conductor 137, conductor 138, the parallel-related actuating coils of the switches 4, 1 and 2 and conductor 139 to the negative conductor 42.

A further auxiliary circuit is established from the control fingers 29 and 30, which are bridged by the contact segment 134, to conductor 38, as previously described, and thence, through conductor 140, control fingers 141 and 142, which are bridged by contact segment 143 of the interlock drum ID in its normal postion $a''$, conductor 144, interlock 4-in, conductors 145 and 114, interlock R2-out and the actuating coils of the parallel-connecting switches P1, P2, G1 and G2.

The main circuits and the auxiliary circuits, of the system shown in Fig. 1, and active at this time, will now be traced and the operation of the system for gradually increasing the voltage of the momentum-driven armatures to a predetermined value above the supply-circuit voltage whereupon the selective relay SR operates, will then be described.

Referring temporarily to Fig. 1, the circuit of the dynamotor or motor-generator set D is completed from the trolley through conductors 70 and 130, switch 131, conductor 132, field-magnet winding DF of the dynamotor driving armature winding M and conductor 132a to the negative conductor ground. It will be understood that the dynamotor under consideration may be employed for other familiar purposes, such as furnishing energy for the auxiliary control system and for driving an air compressor, etc., but, for the sake of simplicity and convenience, I have illustrated the dynamotor as employed only for the purpose of exciting the main field windings during the regenerative period, as about to be described.

Another auxiliary circuit is completed from the lower-voltage terminal of the accelerating resistor AR or, in other words, from the higher-voltage terminal of the switch P1, through conductor 133, the actuating coil of the selective relay SR and conductor 133a to conductor 76 which is connected to the lower-voltage terminal of the main armature A4. It will observed that, by reason of the peculiar location of the selective-relay actuating coil, the coil is adapted to receive the voltage of the set of momentum-driven armatures A3 and A4 when both sets of armatures are connected in parallel relation, that is to say, when the parallel-connecting switches P1 and P2 and G1 and G2 are closed, and is adapted to receive the combined voltages of the sets of momentum-driven armatures when connected in series relation, that is to say, when the series-connecting switches S1 and S2 are closed. The selective relay SR thus operates to initially connect the machine armatures either in parallel or in series relation in accordance with the speed of the momentum-driven vehicle. The selective relay connections just described form no part of my present invention except in so far as they perform certain necessary functions therein, but are fully set forth and claimed in a co-pending application of L. M. Perkins, Serial No. 83,724, filed March 13, 1916, and assigned to the Westinghouse Electric & Manufacturing Company.

The main-circuit connections at this time may be traced as follows: (see also simplified Fig. 9) from the open switch LS2 through conductor 71, a portion of the resistor AR, switch R1, conductor 72, where the circuit divides, one branch including conductor 73, main armatures A1 and A2, conductor 124, switches G1 and G2, conductors 125, 83, and 146, switch 1, conductor 147, field-regulating resistor FR1, junction-point 148, conductor 149, and conductor 150 to the negative conductor ground, and the other branch including conductor 126, switches P1 and P2, conductors 127 and 75, main armatures A3 and A4, conductors 76 and 151, switch 2, conductor 152, field-regulating resistor FR2, and thence, through the junction-point 148, as previously described, to the negative conductor ground, which, during the regenerative period, constitutes the only ground connection of the system, inasmuch as the switch 6 remains permanently opened.

A field-winding exciting circuit is established from one terminal 153 of the exciting armature winding G of the dynamotor through conductors 154 and 149, junction-point 148, where the circuit divides, one branch including field-regulating resistor FR1, conductor 147, switch 1, conductors 146 and 84, the reversing switch RS and the main field windings F1 and F2, conductor 87, junction-point 155, conductor 156, switch 4, and conductor 157 to the other terminal 158 of the exciting armature winding. A similar branch circuit is completed from the junction-point 148 through the field-regulating resistor FR2, conductor 152, switch 2, conductors 151 and 77, the reversing switch RS and the main field windings F3 and F4, conductors 80 and 128, switch 5 and conductors 129 and 88 to the junction-point 155.

The sets of main armatures are thus connected in series relation with the respective field-regulating resistors FR1 and FR2 and the two main-armature circuits are disposed in parallel relation. The exciting armature winding G is connected in series relation with each of the sets of field windings across the corresponding field-regulating resistor. The directions of current in the main armature and main field windings are indicated by the respective arrows, and, inasmuch as the current in the allied armatures and field windings flows in opposite directions, it is not necessary to reverse the reversing-switch RS, as has been requisite in many prior systems. The circuits just traced, however, are not of my present invention but are fully described and claimed in a co-pending application of R. E. Hellmund, Serial No. 44,443, filed August 9, 1915, and assigned to the Westinghouse Electric & Manufacturing Company.

Regulation of the field-circuit resistance to gradually effect an increase of the voltage of the momentum-driven armatures may be accomplished by actuating the master controller MC to its position b', whereby the contact segment 134 engages control finger 160, whence circuit is completed through conductor 161, train-line conductor 162, conductors 162a and 163, control finger 164, contact segment 165 and control finger 166 of the interlock drum ID, conductors 167 and 168, the actuating coil "On" and conductor 169 to the negative conductor 42.

Another circuit is completed from the conductor 162a through conductor 170, control fingers 171 and 172, which are bridged by contact segment 173 of the interlock drum ID in its initial operative position a'', interlock G1–in, conductor 174, interlock 1–in, the actuating coil "Off" of the operating mechanism OM, conductor 175, interlock LS1–out and conductor 176 to the negative conductor 42. Since both of the actuating coils "On" and "Off" are energized, the control drum PK will be actuated to its position $b''$ to short-circuit a predetermined section of the field-regulating resistors FR1 and FR2 and thus increase the field excitation and the armature voltage of the momentum-driven machines.

Moreover, in position $b''$ the control finger 164 continues to engage contact segment 165, but the control finger 171 breaks contact with the contact segment 173. Consequently, the energization of the "on" actuating coil is maintained, whereas the energization of the "off" coil is interrupted. Thus, balanced-pressure conditions obtain in the cylinders of the operating mechanism OM, as previously described, and interlock drum ID is maintained in its position $b''$.

If the voltage of the momentum-driven armature is still not sufficiently high to actuate the selective relay SR, the master controller MC may be moved to its position $c'$, whereby a circuit is completed from the contact segment 134 through control finger 177, conductor 178, train-line conductor 179, conductor 180, and conductor 181 which is connected to the contact segment 173 of the interlock drum in position $b''$ thereof. The "off" actuating coil being thus again energized, the control drum PK will move forward another step to position $c''$, whereupon the connection between the conductor 181 and the contact segment 173 is broken. However, the contour of the contact segment 165 is such that a conductor which corresponds to the conductors 170 and 181, etc., is always connected to the contact segment 165, the energization of the "on" actuating coil being thus maintained.

If the selective relay SR still has not lifted, the master controller MC may be actuated through successive positions until the voltage of the armatures A3 and A4 is sufficient to effect the actuation of the selective relay SR to its upper position. Thereupon, the circuit is completed from the positively-energized contact segment 37 of the reversing-switch RS through conductors 38, 39 and 185, auxiliary contact members 186 of the selective relay SR, conductors 187 and 40, the parallel-related actuating coils of the switches LS1 and LS2, conductor 41, interlock R4-out, and thence through negative conductor 42. As soon as the selective relay has lifted, the switches LS1 and LS2 are closed to connect the momentum-driven machines to the supply circuit to return energy thereto. The closure of the switch LS1 causes an interlock LS1–in to be connected between conductors 185 and 187, that is to say, to bridge the auxiliary contact members of the selective relay, and a second interlock LS1–in bridges the interlock R4-out, thereby subsequently maintaining the switches LS1 and LS2 closed.

The closure of the line switches LS1 and LS2 effects the interruption of the energizing circuit of the actuating coil "Off" by reason of the removal of the interlock LS1-out from that circuit.

Upon the closure of the line switches, however, a circuit is completed from the contact segment 134 of the master controller MC through control finger 102, conductor 103, train-line conductor 104, conductor 105, the actuating coil of the switch R1, conductor 188, interlock 4-in, conductor 189, interlock LS1-in, and conductor 96 to the negative conductor 42. Since the control fingers 107, 108 and 109 are engaged by the contact segment 134 in the initial regenerative position $a'$, the actuating coils of the corresponding switches R2, R3 and R4 are progressively energized as soon as the switch R1 is closed through the interlock circuits described in connection with acceleration and through the interlocks 4-in and LS1-in that have just been mentioned.

When the switch R4 has closed, the circuit of the actuating coil "Off" is again completed from conductor 175 through interlock R4-in and conductor 190 that is connected to the conductor 42. Thus, the actuation of the control drum PK may be continued by suitable manipulation of the master controller after all of the resistance switches R1 to R4, inclusive have closed.

If the master controller occupies position $d'''$, for example, at this time, further step-by-step movement of the interlock drum ID is effected by actuation of the master controller MC to position $e'$, whereupon the interlock drum will assume its position $e''$ which corresponds to full-parallel operation of the momentum-driven machines.

To effect the transition from parallel to series relation, as illustrated in simplified Fig. 10, the master controller is moved toward its position $f'$, whereupon the contact segment 134 engages control fingers 191 and 195, from the first of which circuit is completed through conductor 192, train-line conductor 193 and conductor 194 which is connected to one portion of the contact segment 173 of the interlock drum ID. The other circuit is completed from the control finger 195 through conductor 196, train-line conductor 197 and conductor 198 which is connected to one portion of the contact segment 165 of the interlock drum ID. The purpose of the connections just described is to maintain an energization of the "on" and the "off" actuating coils during the transitional movement of the interlock drum ID from the final parallel position $e''$ to the initial series position $f''$, wherein the contact of the control finger 172 with the contact segment 173 is interrupted, thus maintaining the PK control drum in position $f''$ which corresponds to simplified Fig. 11.

During the transitional movement from position $e''$ to position $f''$, a pair of contact segments 200 and 202, which respectively corresponds to contact segments 165 and 173, engages control fingers 199 and 201 for effecting the energization of the actuating coils "Off" and "On" during the series connection of the momentum-driven machines, as described in detail hereinafter.

Moreover, during the above-mentioned transitional movement, control finger 203 engages the contact segment 143, whence circuit is completed through conductor 204 interlock 4-in, conductor 49, interlock S3-out, conductors 50 and 51, the parallel-related actuating coils of the switches S1 and S2 and conductor 52 to the negative conductor 42. The opening of the switches P1, etc., is not effected by the disengagement of control finger 142 and contact segment 143 during the transitional movement of the interlock drum ID, by reason of the location of an interlock G1-out between conductors 117 and 140 to form a "holding circuit". Thus, prior to the opening of the parallel-connecting switches P1 and G1, the above-mentioned closure of the series-connecting switches S1 and S2 takes place to maintain continuous or uninterrupted regenerative operation.

As soon as the switch S1 has closed, an auxiliary circuit is completed from the control finger 203 through conductor 205, interlock S1-in, conductor 206, interlock 1-in, conductor 94 and thence through the actuating coil of switch S3 in accordance with a previously traced circuit. The actuating coil of the switch S4 is next energized through the conductor 101 and the interlock S1-in, since the corresponding control finger 97 is energized from the contact segment 134 of the master controller. The resistor TR is thus gradually short-circuited.

Movement of the master controller MC to position $g'$ again effects the engagement of the contact segment 134 with the control finger 160, whereby one circuit is completed from the control finger 171 through contact segment 202 of the interlock drum, control finger 201, interlock G1-out, conductor 174, interlock 1-in, the actuating coil "Off", conductor 175, interlock R4-in and conductor 190 to the negative conductor 42; whereas, the energization of the "on" coil is maintained in position $f''$ through the conductor 198 and the contact segment 165. Thus, the "off" coil is energized only after the switch R4 has closed to complete the short-circuit of the resistor AR. Both actuating coils "On" and "Off" being now energized the PK control drum moves to position $g''$, whereupon control finger 171 becomes disengaged from the contact segment 202 to deenergize the "off" coil, while control finger 164 engages the contact segment 200 to maintain the energization of the "on" coil. The control drum PK may thus be actuated through its remaining positions in accordance with the movement of the master controller MC, in a manner similar to that previously described.

Assuming that the speed of the momentum-driven machines is insufficient to permit regenerative operation of the parallel-connected armatures, even though all of the field-circuit resistance is short-circuited, then the master controller MC is moved into its successive positions $f'$ etc., whereupon the selective relay will lift, under the predetermined voltage conditions, to connect the momentum-driven machines to the supply circuit. Under such circumstances, the closure of the line switch LS1 prevents the further operation of the interlock drum ID until the interlock R4—in bridges conductors 175 and 190, which are connected to the "off" coil and to conductor 42, respectively; or, in other words, completes the circuit of the "off" coil. The resistors AR and TR are thus completely short-circuited before the interlock drum ID acts to further exclude the field-circuit resistors FR1 and FR2 from circuit, and, from that time on, the operation of the system is similar to that already described, as indicated in the sequence chart of Fig. 5.

I have thus provided a direct-current regenerative control system wherein a minimum number of switches and circuit changes are required for passing from acceleration to regeneration or vice versa, for two reasons. First, because of the maintenance of the main field windings of the negative or ground side of the main armatures throughout both accelerating and regenerative operations, and secondly, because the design of parts is such that complicated "change-over" switching devices, which have been necessary in many prior systems, such as in the system that is shown in my co-pending application, Serial No. 83,732, filed Mar. 13, 1916, are rendered unnecessary.

I do not wish to be restricted to the specific circuit connections or arrangement and location of parts herein set forth, as various modifications thereof may be made without departing from the spirit and scope of my invention. I desire, therefore, that only such limitations shall be imposed as are indicated in the appended claims.

I claim as my invention:

1. In a system of control, the combination with a supply circuit and a plurality of dynamo-electric machines severally having armatures and field-magnet windings adapted to remain on a predetermined side of said armatures throughout operation, of means for connecting said field windings in direct series relation under predetermined conditions, means for connecting one end of the machine circuit to one supply-circuit conductor, means for connecting one of said field windings through said second means to said supply-circuit conductor under other conditions, and means for preventing the closure of said last means before the opening of said first means.

2. In a system of control, the combination with a supply circuit and a plurality of dynamo-electric machines severally having armatures and field-magnet windings adapted to remain on the negative side of said armatures throughout operation, of a switching device for connecting said field windings in direct series relation under initial accelerating conditions, a second switching device for connecting the negative end of the machine circuit to the negative supply-circuit conductor, a third switching device for connecting one of said field windings through said second switching device to said negative conductor under subsequent accelerating conditions, and means for preventing the simultaneous closure of said first and said third switching devices.

3. In a system of control, the combination with a supply circuit and a plurality of electric motors severally having armatures and field-magnet windings adapted to remain on the negative side of said armatures throughout operation, of a switching device for connecting said field windings in direct series relation under initial accelerating conditions, a second switching device for connecting the negative end of the machine circuit to the negative supply-circuit conductor, means for temporarily connecting a shunt circuit around one motor armature during transition from series to parallel relation of the motors, a third switching device for connecting the field winding of the unshunted motor through said second switching device to said negative conductor under subsequent accelerating conditions, and means for insuring the opening of said first switching device before the closure of said third switching device, whereby a short-circuit of the field winding of the shunted motor is avoided.

4. In a system of control, the combination with a supply circuit and a plurality of dynamo-electric machines severally having armatures and field windings and adapted for both accelerating and regenerative operation, of a plurality of resistors connected in circuit with the main armatures and an auxiliary source of energy connected in series relation with each field winding across the corresponding resistor during the regenerative period, and means for maintaining said field windings on the negative side of said armatures throughout both operations, whereby a relatively small total number of switching devices is necessary and a relatively small number of circuit changes for passing from the one to the other operation is required.

5. In a system of control, the combination with a supply circuit and a plurality of dynamo-electric machines severally having armatures and field windings and adapted for both accelerating and regenerative operation, of a plurality of resistors connected in circuit with the main armatures during regeneration, an auxiliary source of energy having its terminals normally connected to the negative supply-circuit conductor and said resistors and normally open-circuited, respectively, a switching device employed during acceleration for connecting the main-machine circuits to said negative supply-circuit conductor, a second switching device for connecting one of said field windings through the first switching device to said negative conductor during acceleration, a third switching device for connecting said open-circuited terminal to a point intermediate the first and the second switching devices during regeneration, and means for closing said second switching device throughout the regenerative period.

6. In a system of control, the combination with a supply circuit and a plurality of dynamo-electric machines severally having armatures and field windings and adapted for both accelerating and regenerative operation, of a main-machine controlling resistor gradually short-circuited during the initial portion of high-speed regeneration, a second resistor employed only during series operation of the main machines and short-circuited during predetermined lower-speed regeneration, an auxiliary exciting circuit for supplying current to the main field windings, means for increasing the value of said current as the main-machine speed decreases, means for preventing said current variation under said high-speed regenerative conditions until said first resistor is completely short-circuited, and means for preventing said current variation under said lower-speed regenerative conditions until both said first and second resistor are completely short-circuited.

7. In a system of control, the combination with a supply circuit and a plurality of dynamo-electric machines severally having armatures and field windings and adapted for both accelerating and regenerative operation, of a main-machine controlling resistor, a set of progressively-operating switches for short-circuiting said resistor during the initial portion of high-speed regeneration, a second resistor employed only during series operation of the main machines, a second set of switches for gradually short-circuiting said second resistor during predetermined lower-speed regeneration, an auxiliary exciting circuit for supplying current to the main field windings, switching means controlled by the regenerated current for increasing the value of the field-winding current as the main-machine speed decreases, interlocking means for preventing current-varying operation of said switching means under said high-speed regenerative conditions until said first set of switches have all closed, and interlocking means for performing a similar preventive function under said lower-speed regenerative conditions until both said first and said second set of switches have all closed.

8. In a system of control, the combination with a supply circuit and a plurality of dynamo-electric machines severally having armatures and field windings and adapted for both accelerating and regenerative operation, of switching means for connecting the high-voltage terminals of said armatures under "parallel"-operating conditions, a resistor, second switching means for connecting the low-voltage terminal of the first armature to the high-voltage terminal of the second armature through said resistor under "series"-operating conditions, third switching means for connecting the low-voltage terminal of the first armature to the corresponding field winding under "parallel"-operating conditions, and means for effecting parallel-series transition of the armatures comprising means for closing said second switching means to temporarily connect said resistor across the first armature and opening said first and said third switching means at substantially the same instant.

In testimony whereof. I have hereunto subscribed my name this 26th day of May, 1916.

ARTHUR J. HALL.

Copies of this patent may be obtained for five cents each, by addressing the "Commissioner of Patents, Washington, D. C."